US005850679A

United States Patent [19]

Hoffman

[11] Patent Number: 5,850,679

[45] Date of Patent: Dec. 22, 1998

[54] TOOL FOR MOUNTING AND REMOVING WHEEL LUG BOLTS FROM VEHICLE WHEEL HUBS

[76] Inventor: Jay F. Hoffman, 23317 N. Elk Chattaroy Rd., Colbert, Wash. 99005

[21] Appl. No.: 631,797

[22] Filed: Apr. 11, 1996

[51] Int. Cl.[6] .......... B23P 19/04

[52] U.S. Cl. .......... 29/252

[58] Field of Search .......... 29/252, 257, 251, 29/282, 273

[56] References Cited

U.S. PATENT DOCUMENTS

| | | | |
|---|---|---|---|
| 532,265 | 1/1895 | Cornell . | |
| 1,986,493 | 1/1935 | Abramson et al. . | |
| 2,020,162 | 11/1935 | Rodgers . | |
| 2,158,433 | 5/1939 | Schultz . | |
| 2,183,842 | 12/1939 | Mandl . | |
| 2,375,445 | 5/1945 | Sines . | |
| 3,429,021 | 2/1969 | Spiess | 29/257 |
| 3,862,483 | 1/1975 | Kloster . | |
| 4,714,238 | 12/1987 | Spradley et al. | 29/252 |
| 4,903,881 | 2/1990 | Wieland, Jr. . | |
| 4,989,310 | 2/1991 | Choat | 29/252 |
| 5,430,919 | 7/1995 | Starks et al. | 29/257 |
| 5,481,797 | 1/1996 | Barker . | |
| 5,638,909 | 6/1997 | Henderson | 29/252 |

*Primary Examiner*—Robert C. Watson

*Attorney, Agent, or Firm*—Wells, St. John, Roberts, Gregory & Matkin P.S.

[57] ABSTRACT

A vehicle wheel hub lug bolt removal and installation tool and process for installing and removing wheel hub lugs is described. The tool and process are utilized to install and remove lug bolts to and from a wheel hub having a thickness dimension and spaced axially from a brake linkage on a vehicle. The tool may include a ram cylinder having a cylinder body and a piston rod movable along an operational axis. A wheel lug pad is releasably mounted to the piston and moves therewith along the operational axis. A rigid elongated tubular frame including an abutment surface at one end and a ram cylinder mounting surface releasably mount the ram cylinder with the piston rod positioned such that the operational axis intersects the abutment surface. The abutment surface includes a thickness dimension along the operational axis that is sufficient to permit insertion of the abutment surface between a wheel hub and brake assembly of a vehicle. A wheel hub receiving recess is formed by the frame between the abutment surface and wheel lug pad.

18 Claims, 9 Drawing Sheets

TOOL FOR MOUNTING AND REMOVING WHEEL LUG BOLTS FROM VEHICLE WHEEL HUBS

TECHNICAL FIELD

The present invention relates to insertion and removal of wheel lug bolts from wheel hubs, and more particularly to a tool and method for inserting and removing lug bolts from wheel hubs without requiring removal of the wheel hub from the associated vehicle.

BACKGROUND OF THE INVENTION

Wheel lug bolts periodically become stripped, worn, bent or broken and require replacement. The process for removal and replacement of lug bolts has, in the past, required strenuous, time consuming, and hazardous operations. This is especially true for the wheel and lug arrangements found on many large utility vehicles where the lug bolts are mounted to the wheel hub instead of the brake drum.

Lug bolt removal and replacement processes in the past often required removal of the break drum, followed by removal of the wheel hub. The lug bolts were then removed by use of a heavy stationary hydraulic press.

The operation is long, tedious and expensive, since removal of the wheel hub often requires replacement of seals. The cost of the lug bolts themselves is by far eclipsed by the cost of labor in removing and replacing the wheel, and the extra parts required for wheel replacement. The process will often require several hours of labor simply to replace a single low cost lug bolt.

Many mechanics, to avoid the time and expense of removing wheel hubs, will simply try to hammer the lug bolts out with the wheel hub still on the vehicle. This is a hazardous task. The bolts will often chip and the flying shards of metal will easily injure the mechanic. In addition, a slip of the hammer and serious damage can be done to the wheel hub.

A need has thus been long felt for a tool that will enable fast and safe removal and installation of wheel lug bolts with the wheel hub on the associated vehicle. The present invention provides a novel and unobvious solution to this long felt need.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Before describing preferred forms of the present invention in detail, a basic description of the environment in which the invention is used is in order.

Figure 1:
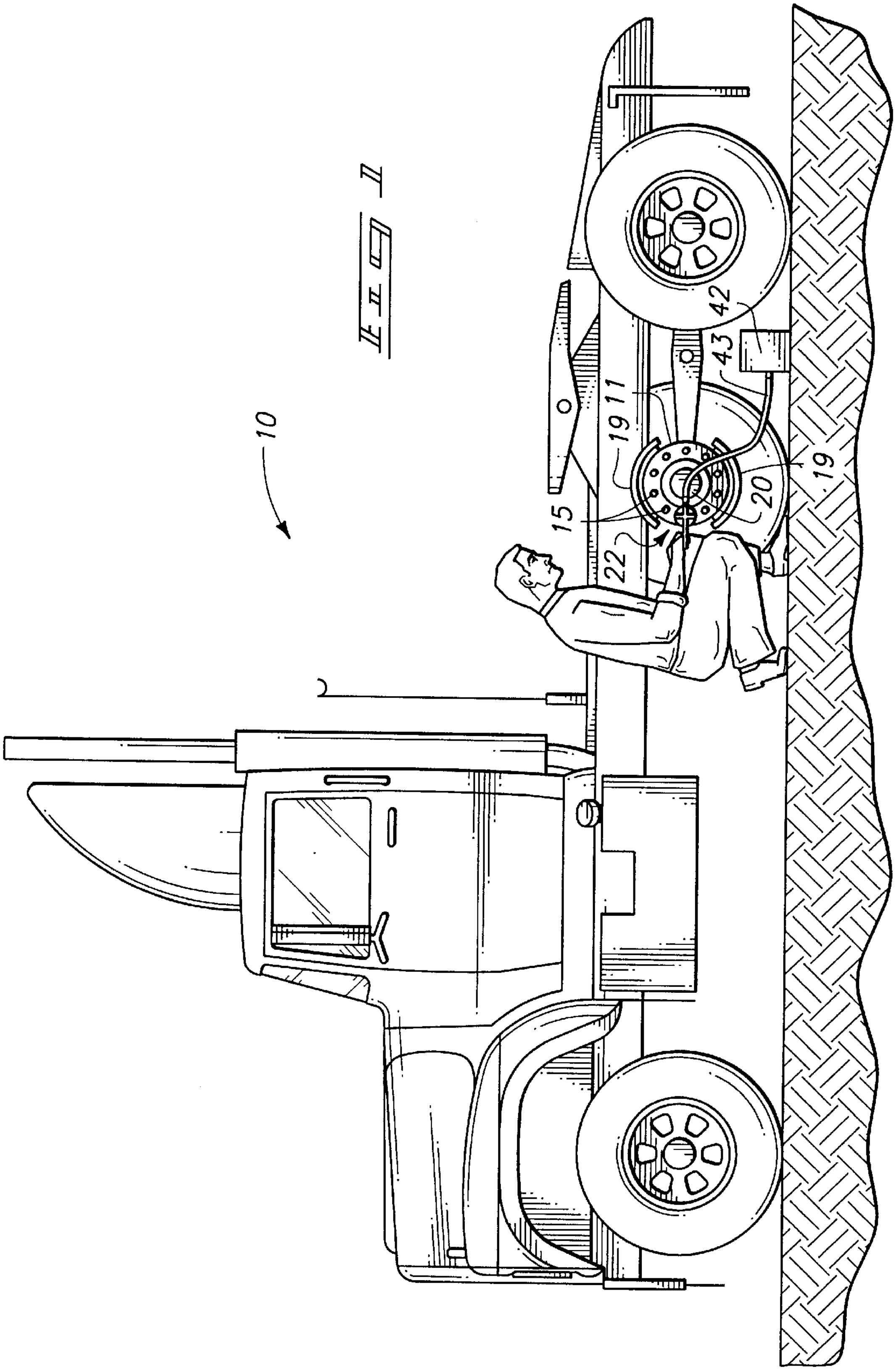
FIG. 1 is a illustrative view of a mechanic using the presently preferred tool on a vehicle mounted wheel hub.

A vehicle 10 is shown in FIG. 1 of the drawings. In the illustration shown, the vehicle is a truck. However, the present invention may be used on other forms of vehicles such as vans, buses, tractors, and other land vehicles using wheels and hubs of the nature exemplified.

In general, the vehicle 10 will include a wheel hub 11 for each wheel. In some instances a single hub will be associated with more than one vehicle wheel, as with large "dual" wheel trucks.

Figure 2:
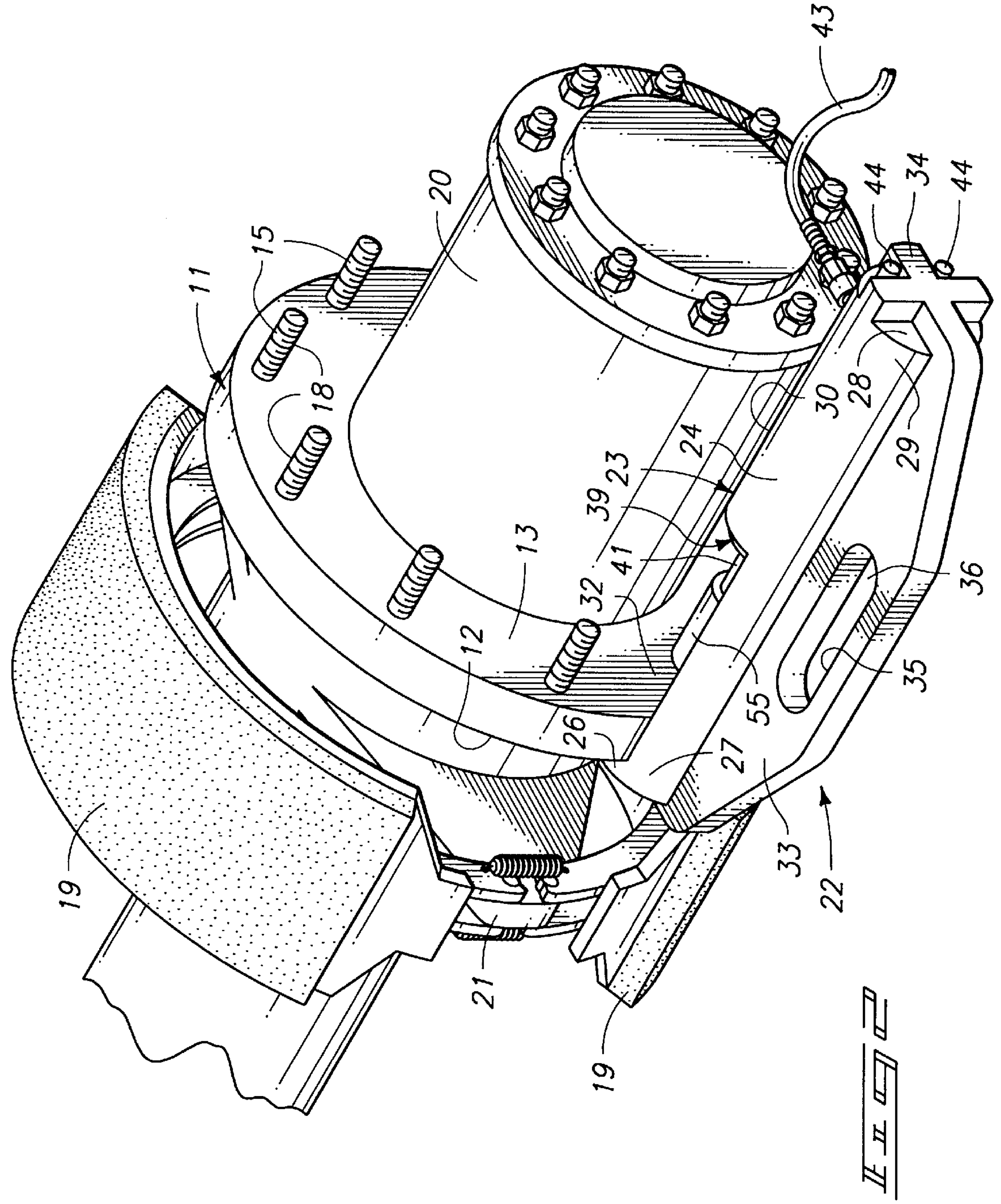
FIG. 2 is a perspective view of a brake drum, wheel hub, lug bolts, and the present tool in operation thereon.
Figure 3:
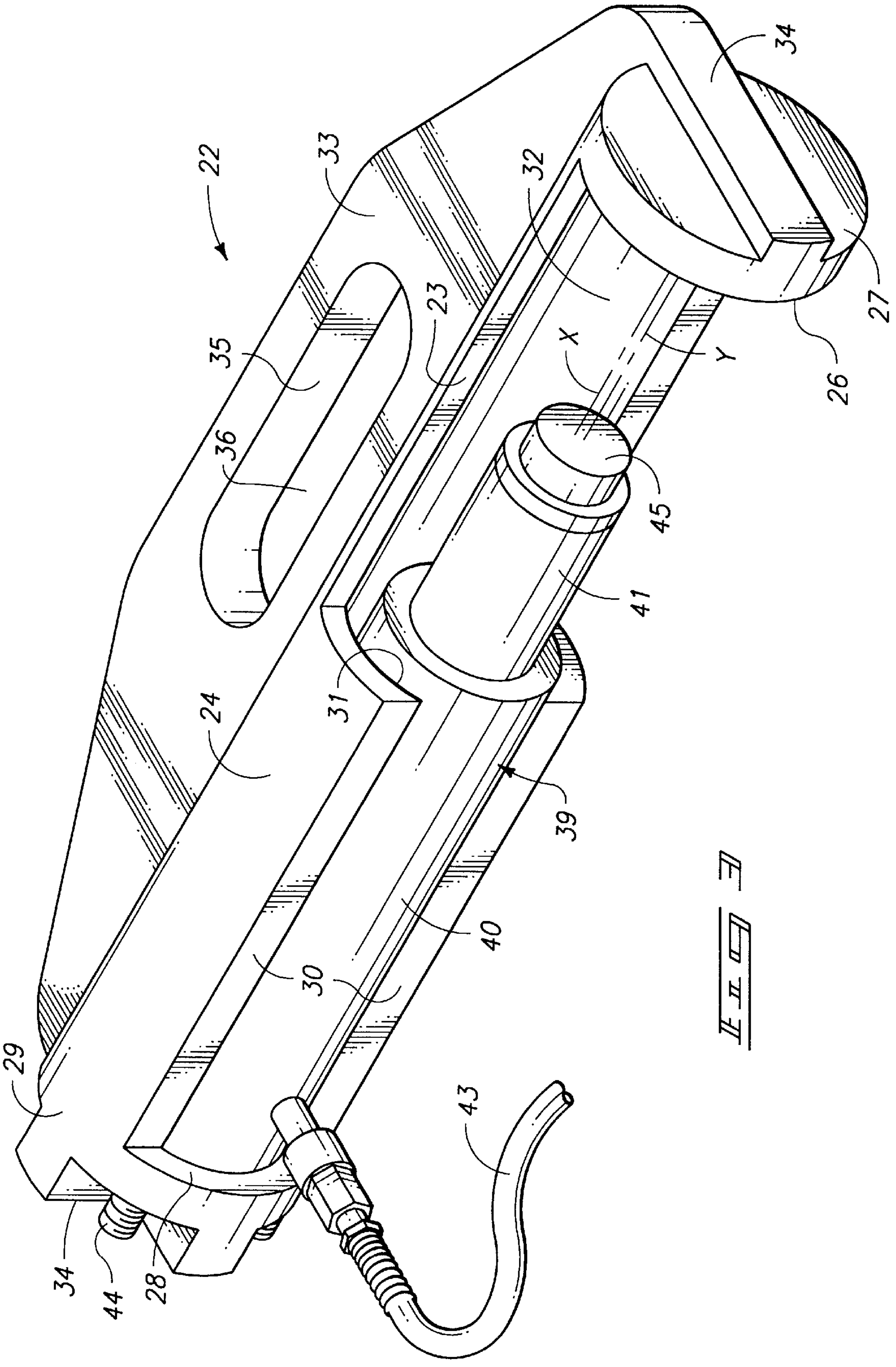
FIG. 3 is a perspective view of a preferred form of the present tool.

In FIG. 2, an exemplary wheel hub 11 is shown. For purposes of description of the invention, the hub 11 is described as including an inner face 12 and an outer face 13. The inner and outer faces 12, 13 define the axial thickness dimension of the hub.

A number of lug bolt orifices 14 (FIG. 10 and others) are equally spaced about the hub, inward of the hub perimeter. Each of these orifices 14 is intended to securely yet releasably mount a wheel lug bolt 15.

The inner face 12 is spaced outwardly of a pair of brake shoes 19 (FIG. 2) on the wheel axle stub 20. The brake shoes are typically pivotably interconnected by a standard brake shoe linkage 21 that is axially centered between the brake shoe edges.

The brake shoes are semi-circular to conform to the brake drum (not shown), but each spans less than 180° so gaps are formed between the ends of their arcuate surfaces. Greater axial clearance (about 4½ inches) thus exists between the brake shoe linkage 21 and inner face 12, than the axial clearance (about 1 inch) between the brake shoes 19 and inner face 12 of the wheel hub.

Figure 8:
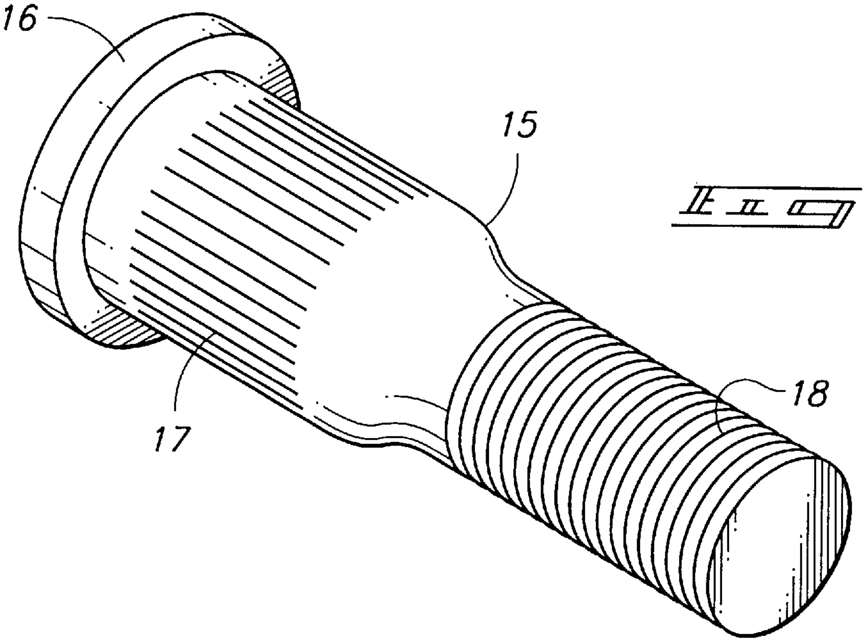
FIG. 8 is a perspective view of a common lug bolt.

FIG. 8 illustrates a typical lug bolt 15. It includes a headed end 16 for abutment with the inside surface of the wheel hub 11 when installed. The lug bolt 15 also includes a crenelated or knurled surface section 17 that is designed to be press fitted into a lug bolt orifice 14. The lug bolt 15 further includes a threaded section 18 that is provided to extend through the vehicle wheel and receive a lug nut (not shown) used to secure the vehicle wheel and tire mounted thereon to the wheel hub.

The present invention is intended for use exclusively for the purpose of inserting and removing wheel lug bolts 15 to and from wheel hubs 11. The invention includes particular structure that is useful in performing this task with the wheel hub in place on the vehicle.

A preferred form of the present vehicle wheel hub lug bolt removal and installation tool is generally illustrated at 22 in the drawings. It utilizes a conventional form of ram cylinder for selectively removing and installing wheel hub lug bolts from a vehicle wheel hub having a thickness dimension and at least one lug bolt receiving orifice as generally described above.

The tool in a preferred form includes a rigid elongated frame 23. The frame is formed of a rigid material such as steel, and is preferably cast from steel (which may be heat treated for added strength) in the configuration shown. Alternatively the frame 23 may be produced from heavy gauge tubing (such as thick walled "Shelby" steel tubing) with portions described below welded in place. In either form, the frame 23 is provided to withstand the considerable forces (up to 20,000 lbs) exerted by the ram cylinder mounted therein.

The preferred frame includes tubular walls 24 of approximately 0.75 inches in radial thickness, forming a semi-cylindrical bore 25. The walls 24 terminate at an abutment surface 26 at one frame end 27.

A ram cylinder mounting surface 28 is also formed by the frame for receiving and mounting a ram cylinder 37. In a preferred form, the cylinder mounting surface 28 is situated at the remaining end 29 of the frame 23, opposite the abutment surface 26. The cylinder mounting surface 28 advantageously spans the cylindrical bore 25, in longitudinal alignment with the abutment surface 26.

Figure 15:
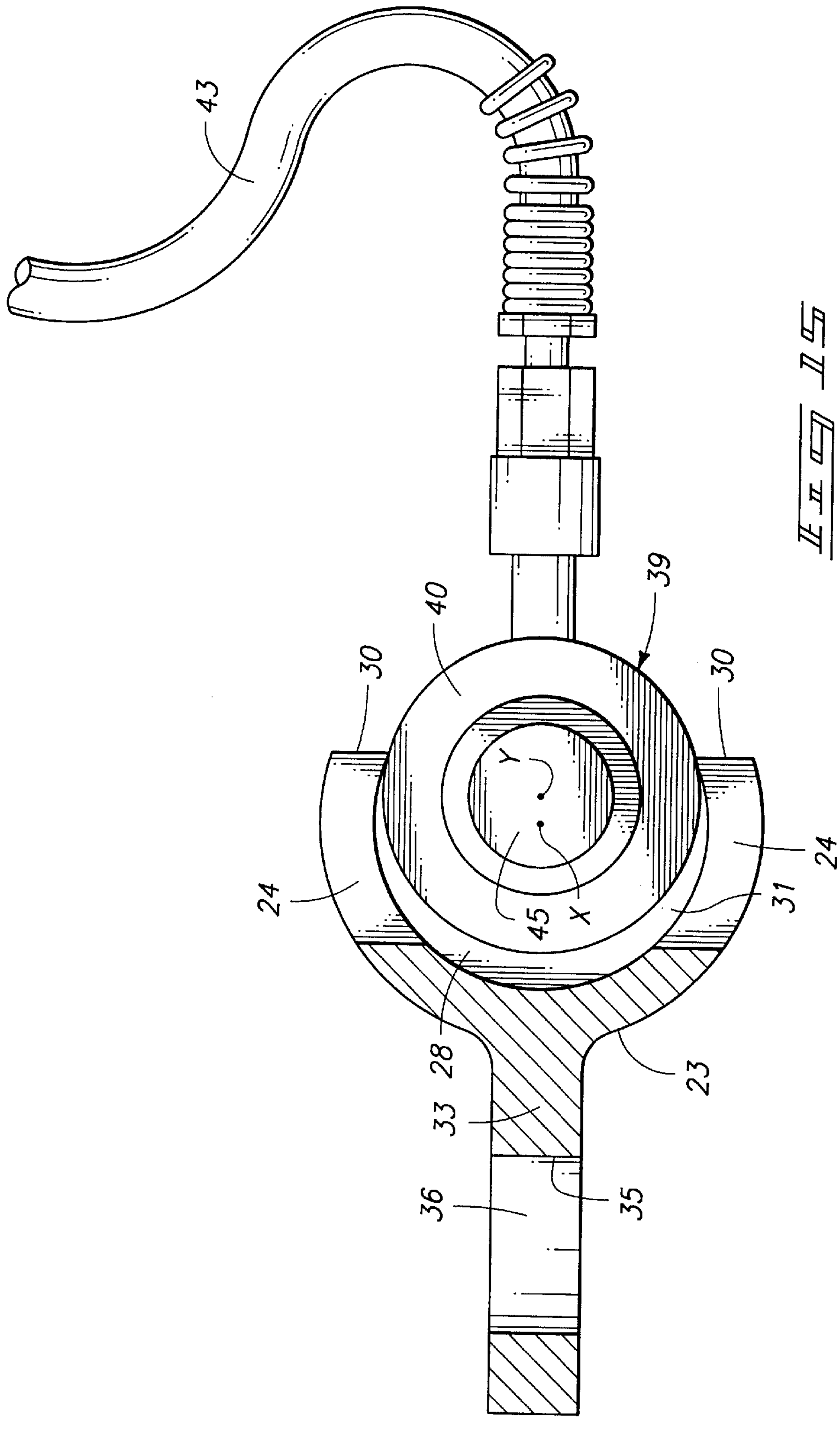
FIG. 15 is an enlarged sectional view taken substantially along line 15—15 in FIG. 9.

In the illustrated example, the frame also includes wall edges 30, leading axially toward the abutment surface 26 from the cylinder mounting surface 28. The edges 30, as shown clearly in FIG. 15, are situated above the central longitudinal axis X of the cylindrical bore 25 and form a ram cylinder receiving recess 31. The edges are spaced so the lateral distance between the edges 30 is less than the diameter of the ram cylinder.

The space between edges 30 leaves an area for a part of the cylinder body to project from the frame, but minimizes the lateral dimension of the tool to facilitate positioning as shown in FIG. 2, adjacent the wheel axle 20. This spacing is also a safety consideration, since those parts of the side walls overlapping the cylinder prevent the cylinder (as shown in FIG. 15), from buckling laterally and springing from its mount within the frame when in use.

A wheel hub receiving recess or notch 32 is formed in the frame between the abutment surface 26 and the ram cylinder receiving recess 31. The recess is defined by the side walls of the frame, and is cut into the frame a distance to facilitate insertion of the frame over a wheel hub 11 as shown in FIGS. 9–14, with the abutment surface 26 overlapping a lug bolt 15.

In one preferred form, the notch 32 is approximately 2½ inches deep from the edges 30 of the side walls to the base of the notch 32. This distance, along with the lateral extent of the abutment surface 26 (about 3 inches from the base of the notch 32) allows for the frame to be placed over a wheel hub with the abutment overlapping the lug bolt head 16.

Reinforcing members 33 extend along the length of the frame and over the abutment surface. The members 33 are provided for adding lateral stability to the frame, and may be integral with the frame (as when the frame is cast) or welded.

Ends of the members 33 advantageously form striking surfaces 34 on the abutment surface and on the opposed end 29 along the cylinder mounting surface 28. If needed, the striking surfaces 34 may be lightly struck when the tool is in use to jar otherwise "frozen" lug bolts loose from a wheel hub.

In one preferred form of the invention, a hand grip surface 35 is provided on one of the longitudinal parts of the reinforcing members 33. The grip surface is most preferably defined by an opening 36 formed through a raised surface in one of the members 33, substantially centered along the length of the tool. The hand grip facilitates carrying and placement of the tool when in use, providing that at least one of the user's hands is clear of moving parts.

The ram cylinder 39 briefly mentioned above is releasably fitted into the ram cylinder receiving recess 31 through the wheel hub receiving notch. The cylinder is most preferably a hydraulic jack type cylinder produced and distributed by such companies as the model c104 by Enerpak of Butler, Wis., model 104 by Simplex of Broadview, Ill., or model c104c by Power Team Hydraulic of Owatonna, Minn.

The above forms of cylinders are commercially available hydraulic ram cylinders of 10 ton capacity and have an approximate stroke length of 4 inches. Other brands of similar size and capacity ram cylinders might be used as well.

The preferred "104" type cylinder will have a cylinder body 40 measuring approximately 2¼ inches in diameter by 6 inches in length. A cylinder of these dimensions functions well and is easily received and mounted within the cylinder receiving recess 31. The piston rod is shown at 41 and extends longitudinally from the cylinder body for motion along an operational axis Y that is fixed when the cylinder is properly mounted to the frame and that intersects the abutment surface 26.

It is pointed out that the abutment surface includes a thickness dimension (about 1 inch) along the operational axis Y that is more than adequate to permit insertion of the abutment surface between the inner face 12 of a wheel hub 11 and brake linkage 21 of a vehicle.

Figure 9:
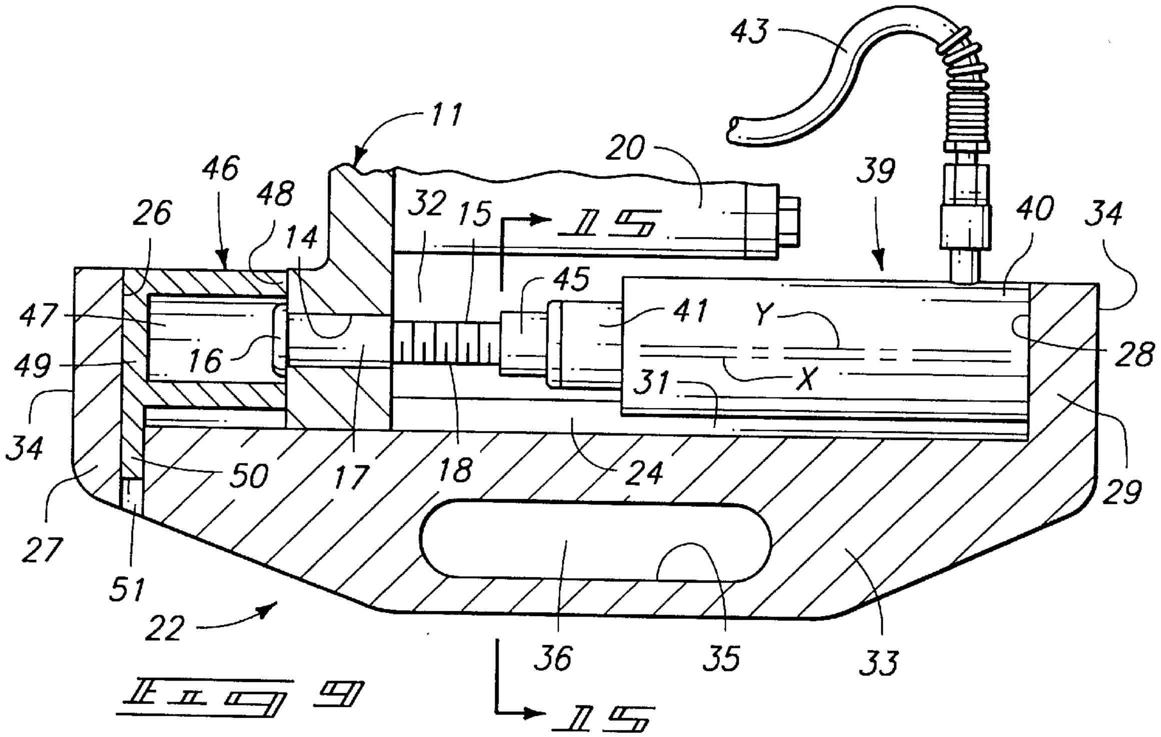
FIGS. 9 and 10 are sectioned operational views showing use of the presently preferred tool and process for removing a lug bolt.
Figure 10:
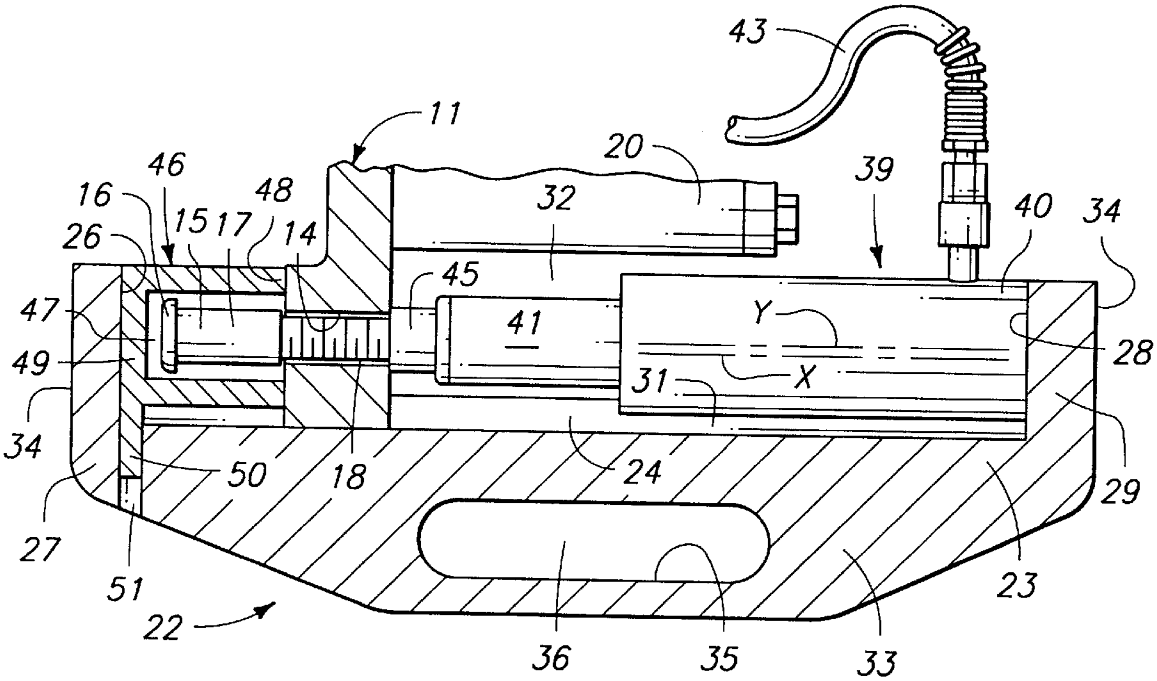

As shown in FIG. 2, the thickness dimension of the abutment surface is specifically provided to facilitate insertion thereof (along with a lug bolt removal cup member 46, as shown in FIGS. 9 and 10 and as described below) between the brake shoe linkage 21 and wheel hub 11 on a vehicle 10 substantially as shown in FIG. 2.

It is preferred that this thickness dimension (including the axial dimension of the lug bolt removal cup 46) be preferably not more than 4 inches. More preferably, the thickness dimension is approximately 3½ inches to permit more freedom for axial motion of the abutment and lug bolt removal cup between the inward surface 12 of the wheel hub and the brake linkage 21.

The ram cylinder 39 may be connected to a provided or existing pump mechanism 42 by way of a hydraulic line 43. The line 43 extends from the cylinder 39 through the space between wall edges 30 of the frame. Both pump 42 and line 43 may be of conventional form and will thus not be described in detail herein.

It is pointed out that the cylinder 39 may be supplied in combination with the frame 23, or may be supplied by the purchaser and mounted to the frame. In either instance, the ram cylinder 39 is fitted to the frame by sliding the cylinder body longitudinally into the cylinder receiving recess 31 through the wheel hub receiving notch 32. The cylinder may then be affixed to the frame by connection to the ram cylinder mounting surface 28 by appropriate bolts 44 or by other appropriate mounting devices.

It is noted at this point that the operational axis Y of the ram cylinder 39 is somewhat offset from the central axis X of the frame 23. This offset is best identified in FIG. 15. The reason for the offset is to maximize the operational "throat"

size of the tool to accommodate the distance from the perimeter of a wheel hub 11 to the lug bolt 15 or lug bolt orifice 14 (between approximately 1½ and 2 inches), while at the same time allowing for positioning of the cylinder body 40 adjacent to the vehicle axle 20 as shown in FIG. 2. Thus with the radial space between the lug bolts 15 or bolt orifices 14 and the surface of the axle 20 being typically about 1½ to 2 inches, the lateral dimension from the operational axis Y to the exposed surface of the cylinder body 40 should be no greater than about 1½ to 2 inches.

Figure 4:
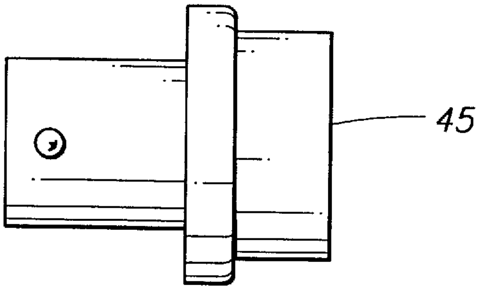
FIG. 4 is an elevational view of a lug bolt pad used in a preferred form of the present invention.
Figure 5:
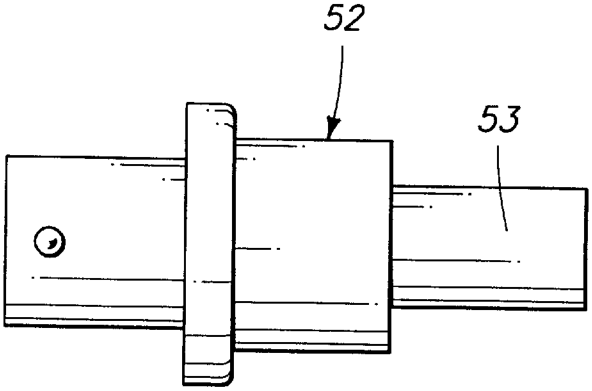
FIG. 5 is an elevational view of a broken lug removal insert for use in the preferred form of the present invention.
Figure 6:
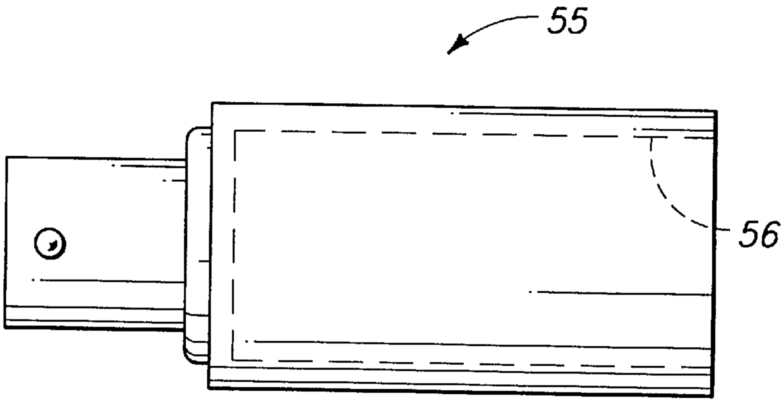
FIG. 6 is an elevational view of a lug bolt mounting cup for use in a preferred form of the present invention for insertion of lug bolts.

Any of several exemplified removable parts (FIGS. 4–6) may be mounted to the piston rod 41 or to abutment surface 26, depending upon the nature of the work to be accomplished with the present tool.

For example, a wheel lug pad 45 may be removably mounted to the piston rod for movement with the piston along the operational axis Y. The lug pad 45 is provided simply to engage ends of normal length lug bolts for the purpose of driving the engaged wheel lug bolt 15 from the associated wheel hub.

Figure 7:
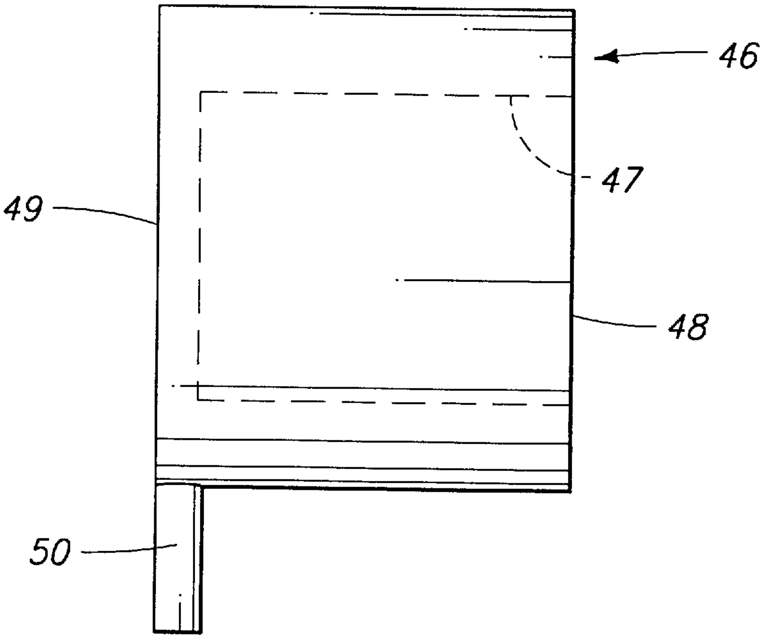
FIG. 7 is an elevational view of a lug bolt removal cup member for use in a preferred form of the present invention for removal of lug bolts.

A lug bolt removal cup member 46 (FIG. 7) is used in conjunction with the pad 45 and may be releasably mounted to the abutment surface 26 for receiving an ejected lug bolt 15, as shown diagrammatically in FIGS. 9 and 10. The lug bolt removal cup member 46 includes an internal lug bolt receiving bore 47 that extends between an open end 48 and a closed end 49.

The surface defining the closed end 49 includes an outwardly projecting tab or pin member 50 that is received in a complementary groove or hole 51 (FIGS. 9–14) in the frame 23. The interfitting tab or pin 50 on the lug bolt removal cup member 46 and complementary notch or hole 51 in the frame 23 facilitate mounting and holding the lug bolt removal cup member 46 on the frame 23.

The tab or pin 50 and hole 51 are also oriented to allow for lateral separation of the frame 23 from the lug bolt removal cup member 46 once the lug bolt 15 has been removed to the position shown in FIG. 10. This eliminates any need for the abutment 26 and lug bolt removal cup member 46 to be moved axially toward the brake linkage 21 in order to separate the tool 22 and removed lug bolt 15 from the wheel hub 11.

In a preferred form, the axial distance between the open and closed ends 48, 49 of the lug bolt removal cup member 46 is approximately 2⁵⁄₃₂ inches. This distance, coupled with the axial thickness dimension of the abutment surface 26 (about 1 inch), is less than the spacing (about 4½ inches) between the typical brake shoe linkage and the inside surface of a wheel hub. Further, the internal axial depth of the cup bore 47 is sufficient, as shown in FIG. 10, to receive the head and crenelated or knurled section 17 of the lug bolt 15.

A broken lug removal insert 52 (FIG. 5) is advantageously provided and is adapted for releasable mounting to the ram cylinder 39. The insert includes provisions at one end as does the lug pad 45, for releasable mounting to the end of the piston rod 41. A stud 53 is provided at the remaining end of the insert 52, of a diameter slightly less than the diameters of the wheel lug bolt orifices 14 in the wheel hub.

Figure 11:
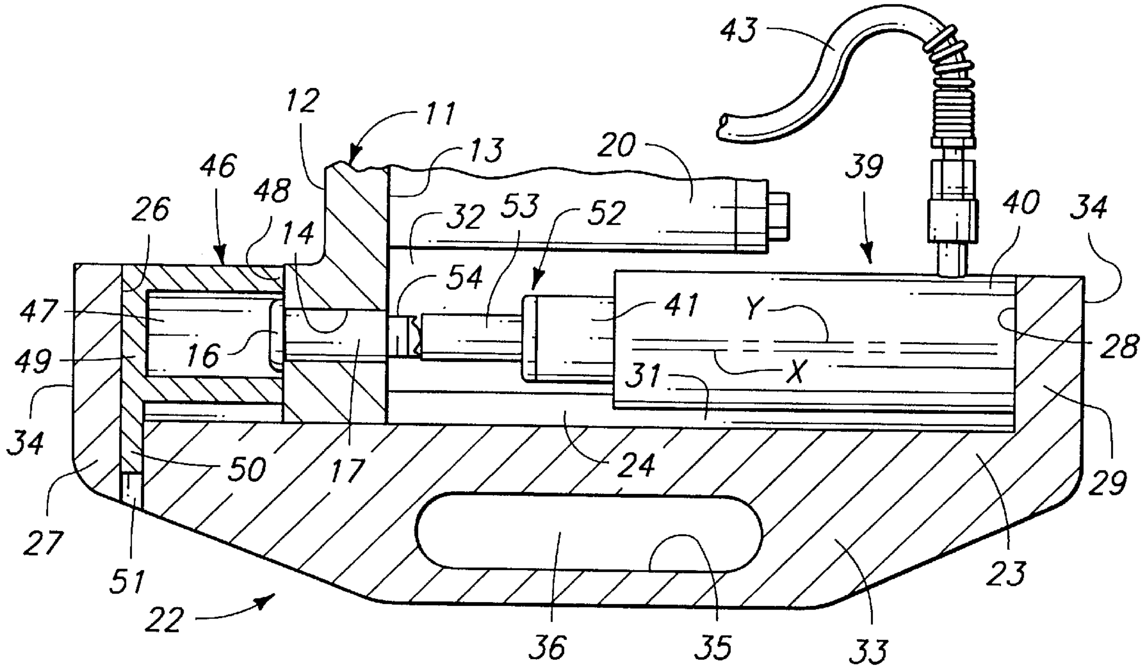
FIGS. 11 and 12 are sectioned operational views showing use of the presently preferred tool and process for removing a broken lug bolt from a wheel hub.
Figure 12:
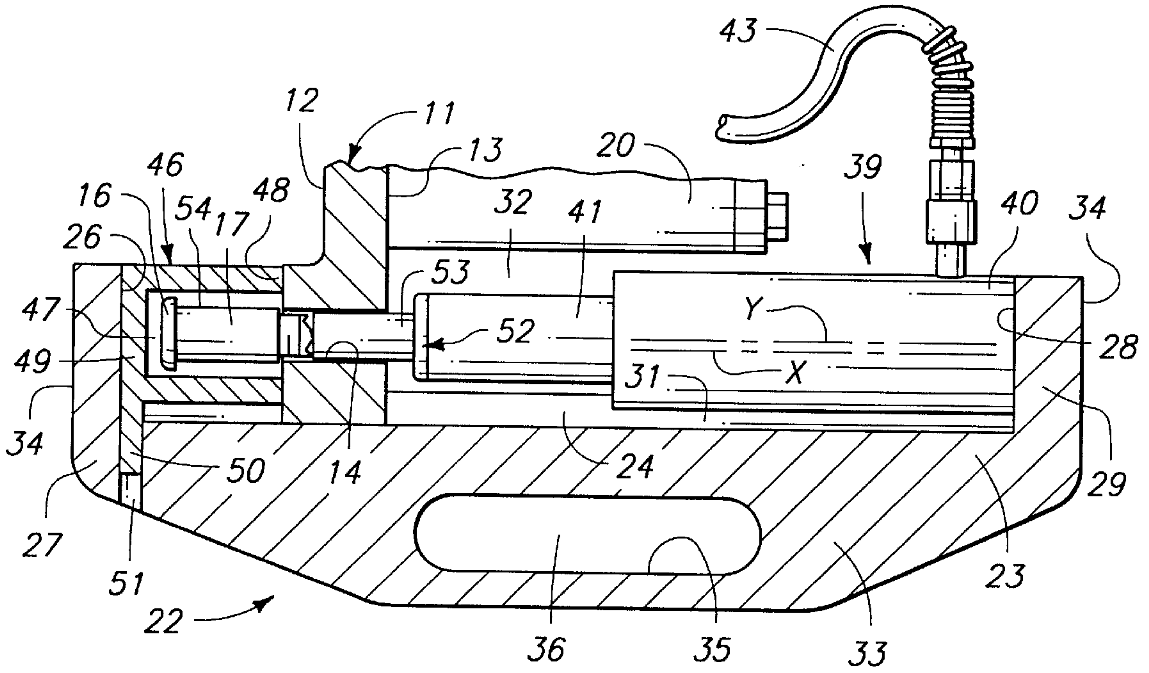
Figure 13:
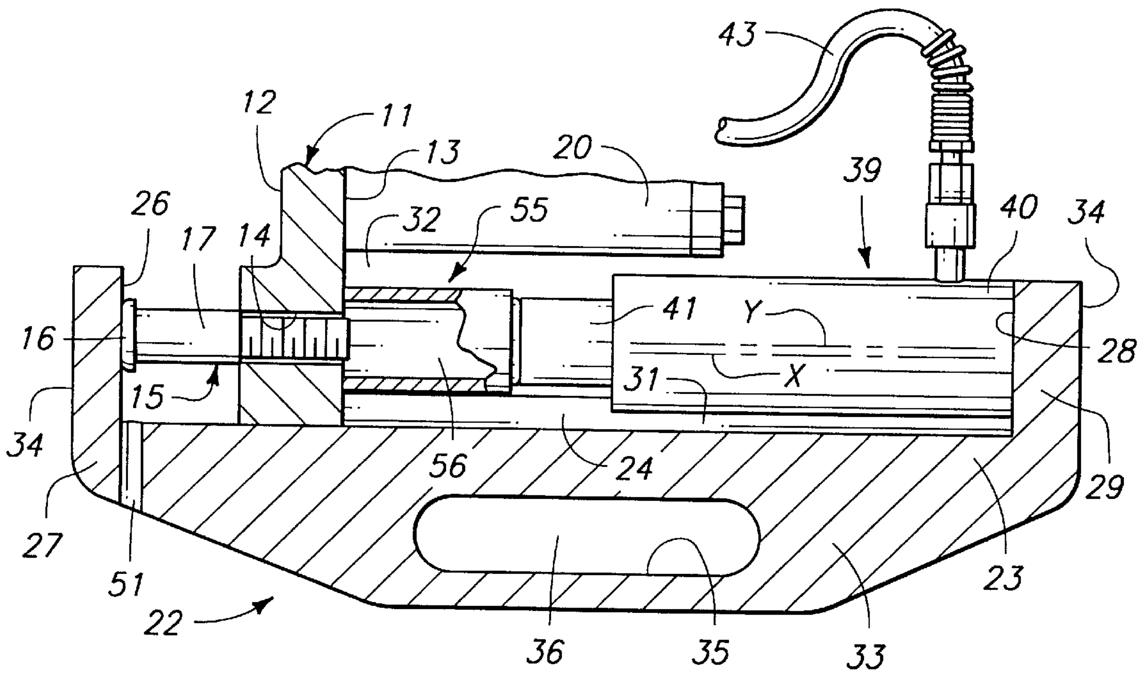
FIGS. 13 and 14 are sectioned operational views showing use of the presently preferred tool and process for inserting a lug bolt into a wheel hub.
Figure 14:
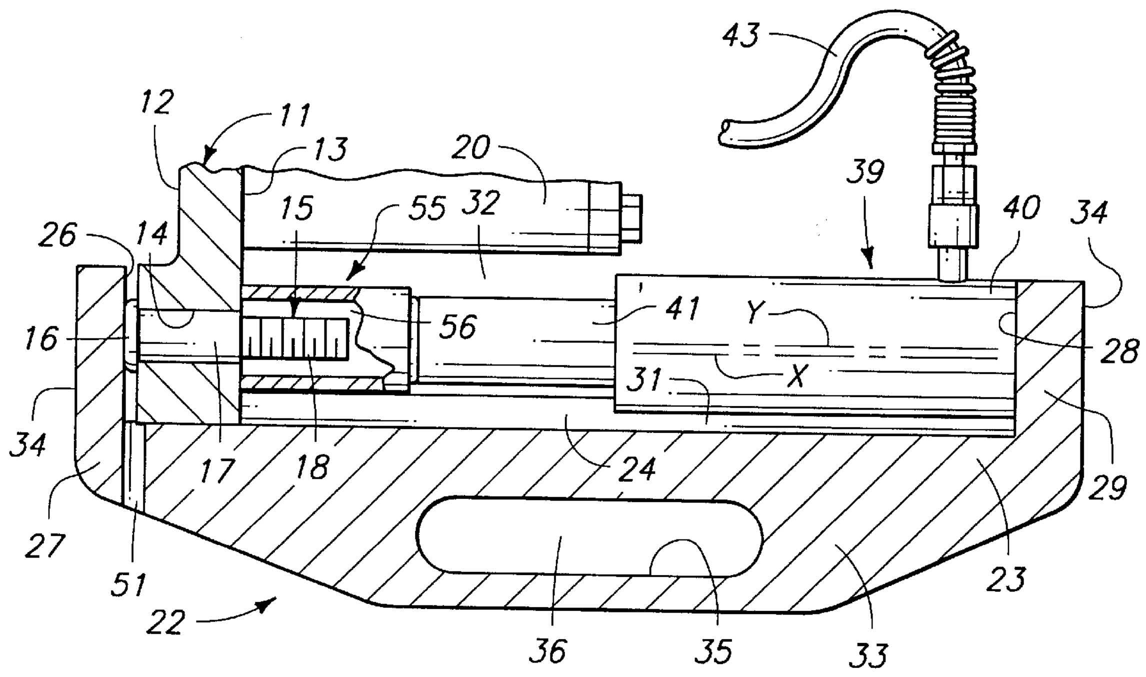

Placed on the piston rod as shown in FIGS. 11 and 12, the insert 52 can be used to remove a broken lug 53 from a wheel hub 11. This operation can be performed even if the threaded part 18 of the lug bolt is broken off within the associated lug bolt orifice 14 because the stud 53 will slide freely into the orifice as shown in FIG. 12.

A lug bolt insertion cup 55 (FIG. 6) is also advantageously provided for releasable attachment to the piston rod 41. An internal bore 56 is formed in the cup 55 to receive the axial part of the lug bolt shank during the insertion process.

From the foregoing description, operation of the present invention and steps of the present method will be readily understood.

Prior to operation of the present tool, the mechanic will remove the vehicle wheel and tire from the selected wheel hub. This is done in the usual manner by loosening and removing the lug nuts from the lug bolts 15. Next the brake drum is removed to expose the wheel hub 11. The present tool and method may now be used to remove and replace the lug bolts 15.

Preferred method steps are disclosed below for removing a wheel hub lug bolt 15 from a lug bolt receiving orifice 14 along a lug bolt axis in a wheel hub having a thickness dimension.

Firstly, the rigid elongated frame 23 is provided with the notch or recess 32 configured to receive at least the thickness of the wheel hub (and most preferably the hub thickness and lug bolt removal cup member 46). The provided frame also will include an abutment surface 26 and an opposing ram cylinder mounting surface 28, the notch or recess 32 being between the abutment surface 26 and ram cylinder mounting surface 28.

If one is not already provided, the next step includes mounting a ram cylinder 39 to the ram cylinder mounting surface, the selected ram cylinder including a piston rod positioned to move along an operational axis toward and away from the abutment surface 26.

For removing lugs, the tool is set up with the lug bolt removal cup member 46 in position against the abutment surface 26, and the wheel lug pad 45 is attached to the piston rod 41.

The ram cylinder 39 is connected to a source of fluid pressure such as an appropriate manual or powered pump substantially as shown in FIG. 1.

Now the rigid elongated frame may be placed over the wheel hub and selected lug bolt, with the notch or recess 32 receiving the thickness of the wheel hub. The abutment surface and ram cylinder are thus situated on opposite sides of the wheel hub and overlap the lug bolt and lug bolt receiving orifice. The tool is positioned so the operational axis Y is substantially coaxial with the lug bolt axis (FIG. 9).

The ram cylinder 39 may now be operated to extend the piston rod 41, to push the lug bolt through the lug bolt receiving orifice (FIG. 10). This is done by operating the pump 42. This completes the lug bolt removal process.

Once the lug bolt 15 is pushed from the wheel hub 11, the ram cylinder may be deactuated and internal spring mechanisms within the cylinder will return piston rod to its original starting position. The frame 23 can now be moved laterally away from the wheel hub, leaving the lug bolt removal cup member 46 (if necessary) in position. The cup member 46 and ejected lug bolt may now be easily removed by hand from behind the wheel hub.

If the selected lug bolt is broken, the mechanic may wish to use the broken lug removal insert 51 (FIG. 11). This is done simply by mounting the insert 51 to the piston rod 41. The same lug bolt removal cup member 46 may be used for this procedure, along with the mounting and operational steps described above.

During operation as the ram cylinder extends, the stud 53 will engage the broken lug 54 and move with the lug 54 into the associated orifice as shown in FIG. 12. The stud 53 is inserted just far enough into the orifice 14 to disengage the crenelated or knurled surface 17 from its previously press fitted engagement within the wheel hub orifice 14.

To insert a fresh lug bolt 15 into a vacant hub orifice 14, the tool is set up with the lug bolt mounting cup 55 on the piston rod 41. This procedure is accomplished without using the lug bolt removal cup member 46, and instead makes use of the abutment surface 26.

The lug bolt 15 is initially inserted by hand through the orifice 14 to a depth where the crenelated or knurled surface 17 comes into contact with the orifice walls. Now the tool is positioned with the abutment surface snug against the lug bolt head and the lug bolt mounting cup 55 on the opposite side of the wheel hub in axial alignment with the orifice 14.

The ram cylinder 39 is now actuated and the extending piston rod forces the mounting cup against the stationary wheel hub. Since the wheel hub is stationary, the piston rod 41 will also become stationary as the mounting cup 55 engages the outer wheel hub surface 13.

In reaction, the entire frame including the cylinder body will now shift axially outward, forcing the abutment surface 26 to push the lug bolt through the wheel hub. The bore 56 of the mounting cup 55 receives the advancing threaded part 18 of the lug bolt 15 as it is driven home.

The mounting cup 55 will retract with the piston rod 41 upon deactuation of the ram cylinder. As the mounting cup 55 retracts, the open end will clear the threaded part 18 of the lug bolt 15 and allow removal of the tool.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A vehicle wheel hub lug bolt removal and installation tool utilizing a ram cylinder for selectively removing and installing wheel hub lug bolts from a vehicle mounted wheel hub adjacent a brake drum and brake linkage and with the wheel hub having a thickness dimension and at least one lug bolt receiving orifice, comprising:

- a rigid elongated frame including an abutment surface at one end, and a ram cylinder mounting surface at a remaining end;
- a cup member releasably mountable to the abutment and including an internal lug bolt receiving bore;
- a ram cylinder receiving recess formed in the elongated frame between the ram cylinder mounting surface and the abutment surface; and
- a wheel hub receiving recess formed by the frame between the abutment surface and ram cylinder receiving recess.

2. The tool of claim 1 wherein the frame is tubular with a substantially cylindrical bore formed by tube walls.

3. The tool of claim 1 wherein the frame is tubular with a substantially cylindrical bore formed by tube walls, and wherein the abutment surface spans the cylindrical bore at the one end of the frame, and the ram cylinder mounting surface spans the cylindrical bore at the remaining end of the frame.

4. The tool of claim 1 wherein the frame is tubular with a substantially cylindrical bore formed by tube walls and wherein the ram cylinder receiving recess is formed by the tube walls within the substantially cylindrical bore.

5. The tool of claim 1 wherein the ram cylinder mounting surface includes a ram cylinder mount positioned thereon to secure a ram cylinder along a fixed operational axis.

6. The tool of claim 1 wherein the wheel hub receiving recess includes a longitudinal and transverse dimension sufficient to receive a wheel hub thickness dimension and a lug bolt receiving orifice in the wheel hub in longitudinal alignment with the abutment surface.

7. The tool of claim 1 further comprising longitudinal reinforcing members extending along the length of the frame and over the abutment surface.

8. The tool of claim 1 further comprising longitudinal reinforcing members extending along the length of the frame and over the abutment surface, and forming a striking surface along the abutment surface.

9. The tool of claim 1 further comprising longitudinal reinforcing members extending along the length of the frame and over the abutment surface, and including a hand grip surface formed therein.

10. The tool of claim 1, further comprising:

- wherein the cup member and abutment include an axial dimension sufficient to permit insertion of the cup member and abutment between the brake linkage and inner surface of a wheel hub.

11. The tool of claim 1, further comprising:

- a tab projecting from the cup member; and
- a tab receiving hole formed in the frame adjacent the abutment surface for releasably receiving the tab.

12. The tool of claim 1, wherein the internal lug bolt receiving bore of the cup member extends from an open end to a closed end, the closed end being configured to be releasably mounted to the abutment.

13. The tool of claim 1 further comprising a broken lug bolt removal insert adapted to be mounted to the ram cylinder.

14. The tool of claim 1 further comprising a lug bolt mounting cup insert adapted for releasable mounting to the ram cylinder.

15. The tool of claim 1, further comprising:

- a broken lug bolt removal insert adapted for releasable mounting to the ram cylinder.

16. A vehicle wheel hub lug bolt removal and installation tool for installing and removing wheel hub lugs to and from a wheel hub having a thickness dimension and spaced axially from a brake linkage on a vehicle, the tool comprising:

- a ram cylinder having a cylinder body and a piston rod movable along an operational axis;
- a wheel lug pad mountable to the piston, movable with the piston along the operational axis;
- a rigid elongated tubular frame including an abutment surface at one end and a ram cylinder mounting surface releasably mounting the ram cylinder with the piston rod positioned such that the operational axis intersects the abutment surface;
- a wheel lug removal cup releasably mountable to the abutment surface, and having an open end
- wherein the abutment surface and wheel lug removal cup include a thickness dimension along the operational axis that is sufficient to permit insertion of the abutment surface and wheel lug removal cup between a wheel hub and brake assembly of a vehicle; and
- a wheel hub receiving recess formed by the frame between the abutment surface and wheel lug pad.

17. The tool of claim 16 wherein the frame includes a substantially cylindrical bore formed by tube walls and wherein the ram cylinder receiving recess is formed by the tube walls within the substantially cylindrical bore.

18. The tool of claim 16 wherein the frame includes a substantially cylindrical bore formed by tube walls and wherein the ram cylinder receiving recess is formed by the tube walls within the substantially cylindrical bore between the ram cylinder mounting surface and the wheel hub receiving recess.

* * * * *